United States Patent
Manke et al.

(10) Patent No.: US 7,073,452 B1
(45) Date of Patent: Jul. 11, 2006

(54) AUTOMATED TREE SPADE CENTERING DEVICE

(76) Inventors: Todd M. Manke, 240 Verbena La., Woodstock, IL (US) 60098; Darren A. Smith, 9414 Route 14, Woodstock, IL (US) 60098

( * ) Notice: Subject to any disclaimer, the term of this patent is extended or adjusted under 35 U.S.C. 154(b) by 0 days.

(21) Appl. No.: 11/220,434

(22) Filed: Sep. 7, 2005

(51) Int. Cl.
*A01C 11/00* (2006.01)
*A01G 23/02* (2006.01)
*A01G 23/06* (2006.01)
*A01B 13/00* (2006.01)

(52) U.S. Cl. .......................... 111/101; 37/302

(58) Field of Classification Search ........ 111/100–102, 111/114; 37/301–303, 411, 413, 435
See application file for complete search history.

(56) References Cited

U.S. PATENT DOCUMENTS 4,909,330 A * 3/1990 Kasher et al. ................. 172/4

* cited by examiner

*Primary Examiner*—Christopher J. Novosad
(74) *Attorney, Agent, or Firm*—Mathew R. P. Perrone, Jr.

(57) ABSTRACT

An automated device for centering a mechanical tree spade provides a sighting device on each blade thereof with a readout adjacent to the operator to determine proper blade placement in order to provide an acceptable root ball for transplanting a tree.

18 Claims, 4 Drawing Sheets

AUTOMATED TREE SPADE CENTERING DEVICE

This invention relates to an automated tree spade centering device, and more particularly, to an automated tree spade centering device, which includes a centering mechanism in order to assist the tree spade in the obtaining of a desirable root ball to thereby facilitate replanting of the tree.

BACKGROUND OF THE INVENTION

In the landscaping business, transplanting of larger trees is a popular method of achieving an aesthetically pleasing landscape appearance, without the necessity of planning smaller trees and waiting for them to grow. To that end, many devices are known to assist in such a project.

For example, a mechanical tree spade is commonly known in the prior art as used to remove such a large tree. The typical mechanical tree spade includes a housing with a number of blades mounted thereon. These blades form a very large circular spade, usually with about four blades, which can then be assembled around the trunk of a tree. The blades can then be driven into the ground and collapsed around the root ball of the tree. The tree can then be lifted out of the ground and transported to a desired position.

However, it is a major difficulty to center a mechanical tree spade around the root ball of a tree. Yet, by centering the mechanical tree spade around the root ball, the best root ball is achieved, so that replanting of the tree in a desired location provides the best chance for the tree to thrive in the new area.

One partially effective method, as shown in FIG. 1, for achieving desired center positioning of the mechanical tree spade 110 mounted on a truck 102 is having a control person 104 and a siting person 106 at the digging site, to assist in the positioning of the mechanical tree spade 110. The cost of this additional siting person 116, combined with the unsure accuracy provided thereby, brings the efficiency thereof into great question. It is very desirable to provide a more efficient manner of centering the mechanical tree spade around a tree decided to be transplanted.

It is further very useful to be able to modify an existing mechanical tree spade to have a centering device. Such an adaptable centering device provides a great cost savings if the centering device can be added to an existing mechanical tree spade, rather than having to replace the entire mechanical tree spade.

SUMMARY OF THE INVENTION

Among the many objectives of this invention is the provision of an automated device for centering a mechanical tree spade around a tree, which permits a root ball for the tree to be formed in an efficient fashion.

A further objective of this invention is the provision of an automated device for centering a mechanical tree spade, which reduces labor costs of transplanting a tree.

Yet a further objective of this invention is the provision of an automated device for centering a mechanical tree spade, which positions the mechanical tree spade around a tree efficiently.

A still further objective of this invention is the provision of an automated device for centering a mechanical tree spade, which is easily installed.

Another objective of this invention is the provision of an automated device for centering a mechanical tree spade, which improves the success rate for tree transplants.

Yet another objective of this invention is the provision of an automated device for centering a mechanical tree spade, which may be added to an existing mechanical tree spade.

These and other objectives of the invention (which other objectives become clear by consideration of the specification, claims and drawings as a whole) are met by providing an automated device for centering a mechanical tree spade in order to provide an acceptable root ball for transplanting a tree.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

With the automated tree spade centering device of this invention, a mechanical tree spade has a housing with a series of blades thereon. On each of the blades is a sighting device. Each sighting device reads the position of its respective blade relative to a desired point.

Also, the position of the sighting device is read relative to the other sighting devices. At least one of the sighting devices on each of two blades are desired. More preferred is a sighting device on each of three blades. Most preferred, is a sighting device on each of blade in the series of blades.

By coordinating the readings of all sighting devices, the desired position of the mechanical tree spade permits the blades thereof to be arranged so that the desired area the root ball is properly located. In this fashion, the blades can be coordinated to strike the ground and remove the desired root ball with the tree.

Customarily, the desired center point is based on the central vertical axis of the trunk of the tree sought to be transplanted. This device is used on a tree spade for digging a coniferous or deciduous tree. On each blade of the tree spade is positioned a sighting device, which concerns the position of each blade together with the orientation of the tree trunk in relation to the tree ball circumference. With the sighting device, it is quite possible to position the tree trunk in the center of the root ball in order to maintain a viable root zone more efficiently.

Figure 1:
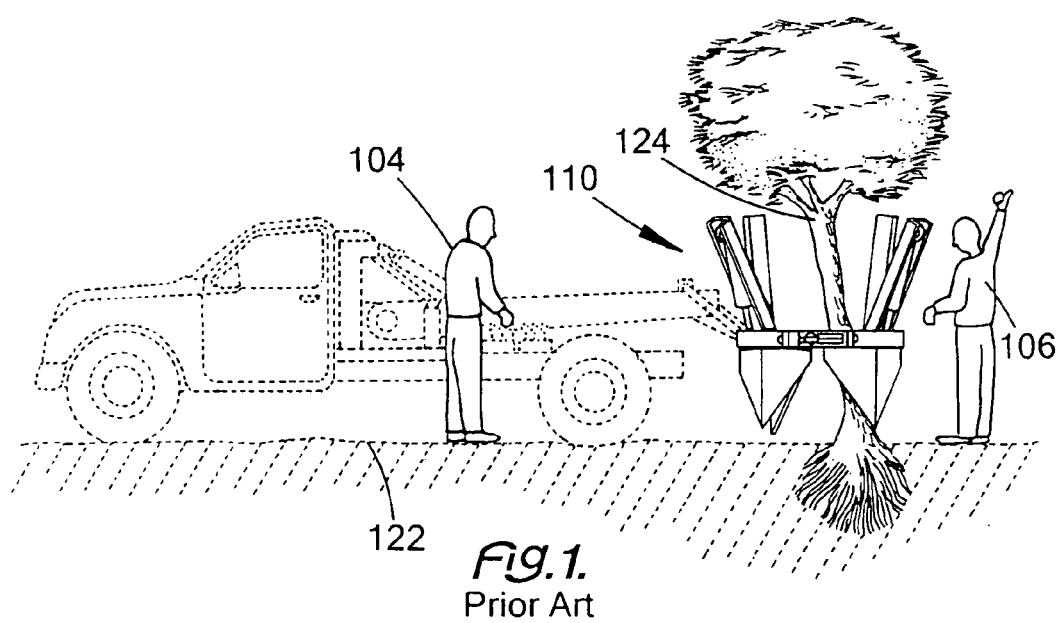
FIG. 1 depicts a prior art view of the use of a mechanical tree spade 110.
Figure 2:
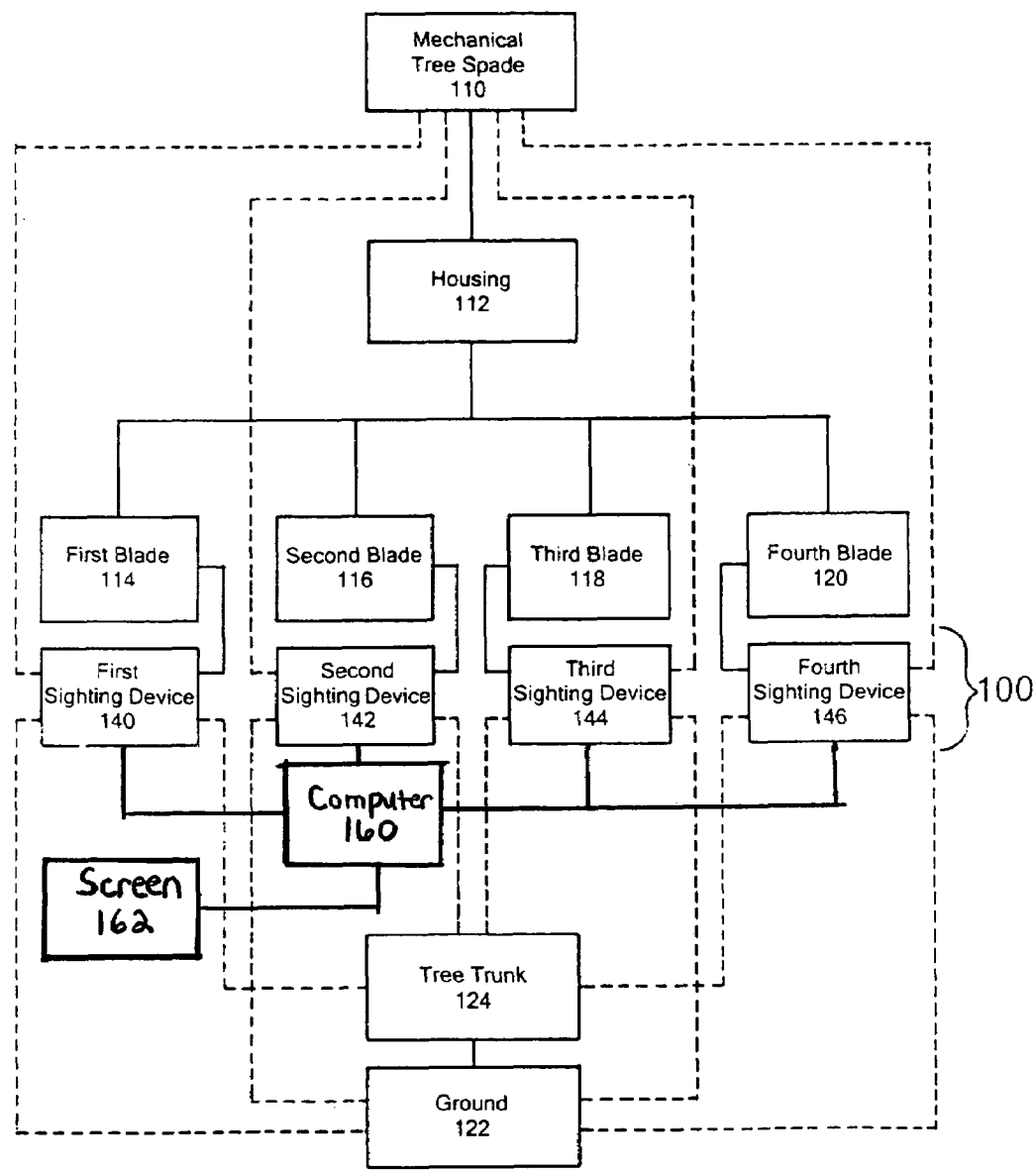
FIG. 2 depicts a block diagram of the automated tree spade centering device 100 of this invention mounted on a mechanical tree spade 110.

Referring now to FIG. 2, the automated tree spade centering device 100 is mounted on a mechanical tree spade 110. The mechanical tree spade 110 has a housing 112 with a series of blades mounted thereon. Preferably, the blades are equally spaced around the housing 112 and include first blade 114, second blade 116, third blade 118 and fourth blade 120. Optionally, other blade or blades may be attached to the housing 112 as desired. The four blade assembly is preferred.

Figure 3:
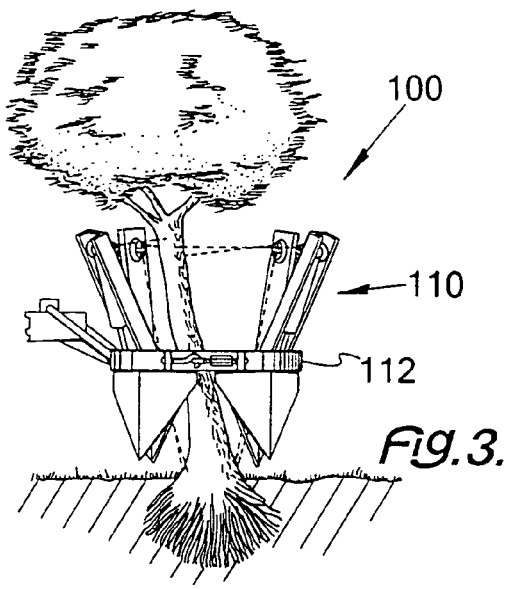
FIG. 3 depicts a perspective view of the automated tree spade centering device 100 of this invention mounted on a mechanical tree spade 110.
Figure 4:
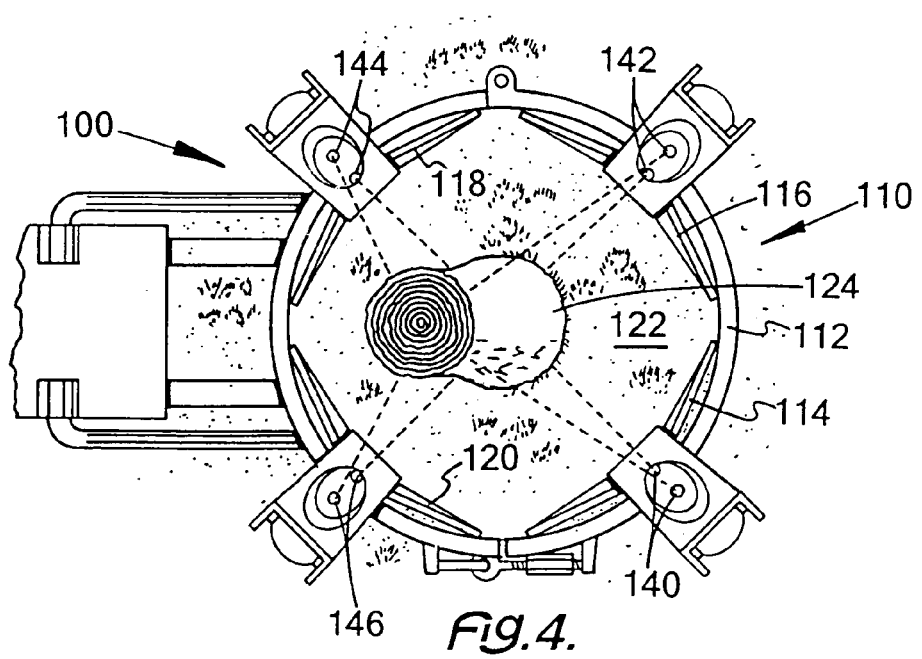
FIG. 4 depicts a top plan view of four of blades on housing 112 for the mechanical tree spade 110, each with a sighting device mounted on the blades.

Adding FIG. 3 and FIG. 4 to the consideration, automated tree spade centering device 100 includes at least first sighting device 140 mounted on first blade 114 and second sighting device 142 mounted on second blade 116. Most preferred is the addition of third sighting device 144 mounted on third blade 118 and fourth sighting device 146 mounted on fourth blade 120 to first sighting device 140 mounted on first blade 114 and second sighting device 142.

Each of the four sighting devices reads the position of each blade relative to the ground 122 and the tree trunk 124. Each blade is then positioned so that the trunk 124 is at the center point of a circle formed by first blade 114, second blade 116, third blade 118 and fourth blade 120.

Readouts from first sighting device 140, second sighting device 142, third sighting device 144 and fourth sighting device 146 are fed in a standard fashion to computer 160. Computer 160 is programmed to take readouts and display the position of first blade 114, second blade 116, third blade 118 and fourth blade 120 around the trunk 124 of tree 126 and ground 128. Once a desired center point is reached with the trunk 124 thereon, of first blade 114, second blade 116, third blade 118 and fourth blade 120 are cooperatively activated to remove the tree trunk 124 with an effective root ball 130.

Computer 160 provides a screen readout 162 easily read by the operator (not shown). When the operator sees proper positioning of the blades on the screen 162, the tree trunk 124 can be properly dug out of a current location and moved to a desired location.

Figure 5:
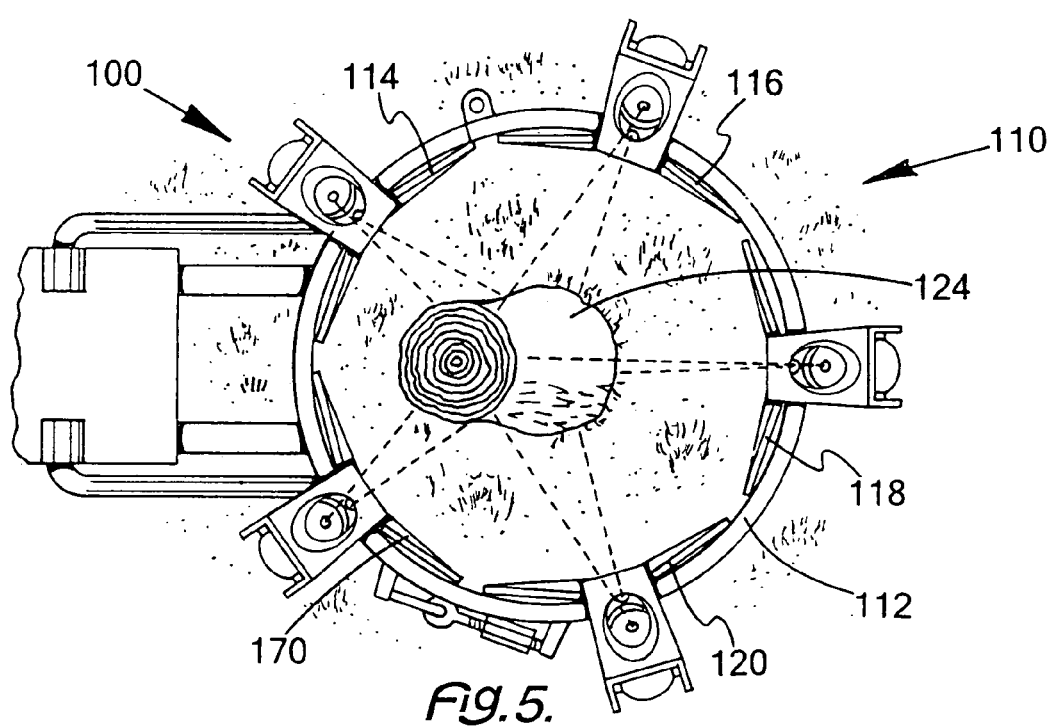
FIG. 5 depicts a top plan view of five of blades on housing 112 for the mechanical tree spade 110, each with a sighting device mounted on the blades.

FIG. 4 displays the use of four blades and FIG. 5 displays the use of five blades. With the five blade system, in addition to first blade 114, second blade 116, third blade 118 and fourth blade 120, fifth blade 170 is added with appropriate size adjustments being made in the other blades. Like the other blades, fifth blade 170 has a fifth sighting device 172, which function in the same way as the similar devices. Such a structure illustrates the variation in the plurality of blades to be used.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed is:

1. In a mechanical tree spade having a housing with a series of blades thereon, the series of blades including a positioning means for the series of blades for centering the series of blades around a tree to be transplanted, the improvement comprising:
   (a) the series of blades including at least a first blade and a second blade;
   (b) a first sighting device being mounted on the first blade;
   (c) a second sighting device being mounted on the second blade;
   (d) the first sighting device and the second sighting device each providing a coordinating read out to a desired location;
   (e) the coordinating read out being related to the positioning means; and
   (f) the positioning means being adjustable relative to the coordinating read out.

2. The improvement for the mechanical tree spade of claim 1 further comprising:
   (a) the positioning means having a control means;
   (b) the mechanical tree spade being operated by the control means; and
   (c) the coordinating read out being visible from the control means.

3. The improvement for the mechanical tree spade of claim 2 further comprising:
   (a) the control means permitting the series of blades thereof to be arranged so that a root ball for a tree to be transplanted is properly located pursuant to the coordinating read out;
   (b) the control means adjusting the series of blades pursuant to the coordinating read out; and
   (c) the series of blades being positioned so that a trunk of a tree to be transplanted is at a center point of a circle.

4. The improvement for the mechanical tree spade of claim 3 further comprising:
   (a) the series of blades including at least the first blade, the second blade; a third blade and a fourth blade;
   (b) a third sighting device being mounted on the third blade;
   (c) a fourth sighting device being mounted on the fourth blade; and
   (d) the first sighting device, the second sighting device, the third sighting device and the fourth sighting device each providing the coordinating read out to a desired location.

5. The improvement for the mechanical tree spade of claim 3 further comprising the series of blades including at least the first blade, the second blade; a third blade and a fourth blade.

6. A positioning means for a series of blades on a mechanical tree spade for centering the series of blades ground a tree to be transplanted comprising:
   (a) the series of blades including at least a first blade and a second blade;
   (b) a first sighting device being mounted on the first blade;
   (c) a second sighting device being mounted on the second blade;
   (d) the first sighting device and the second sighting device each providing a coordinating read out to a desired location;
   (e) the coordinating read out being related to the positioning means; and
   (f) the positioning means being adjustable relative to the coordinating read out.

7. The positioning means of claim 6 further comprising:
   (a) the positioning means having a control means;
   (b) the mechanical tree spade being operated by the control means; and
   (c) the coordinating read out being visible from the control means.

8. The positioning means of claim 7 further comprising:
   (a) the control means permitting the series of blades thereof to be arranged so that a root ball for a tree to be transplanted is properly located pursuant to the coordinating read out;

(b) the control means adjusting the series of blades pursuant to the coordinating read out; and
(c) the series of blades being positioned so that a trunk of a tree to be transplanted is at a center point of a circle.

9. The positioning means of claim 8 further comprising:
(a) the series of blades including at least the first blade, the second blade; a third blade and a fourth blade;
(b) a third sighting device being mounted on the third blade;
(c) a fourth sighting device being mounted on the fourth blade; and
(d) the first sighting device, the second sighting device, the third sighting device and the fourth sighting device each providing the coordinating read out to a desired location.

10. The positioning means of claim 8 further comprising the series of blades including at least the first blade, the second blade; a third blade and a fourth blade.

11. The positioning means of claim 10 further comprising a third sighting device being mounted on the third blade.

12. A method of positioning a mechanical tree spade around a tree trunk in order to remove a tree with a proper root ball for transplanting the tree comprising:
(a) providing a housing with a series of blades thereon, the series of blades including a positioning means for the series of blades;
(b) providing a sighting device on at least two members of the series of blades, the at least two members including at least a first blade and a second blade;
(c) mounting a first sighting device on the first blade;
(d) mounting a second sighting device on the second blade;
(e) providing a coordinating read out from the first sighting device and the second sighting device each providing a coordinating read out to a desired location;
(f) relating the coordinated read out to the positioning means; and
(g) adjusting the positioning means relative to the coordinating read out in order to provide a desired root ball.

13. The method of claim 12 further comprising:
(a) the positioning means having a control means;
(b) the mechanical tree spade being operated by the control means; and
(c) the coordinating read out being visible from the control means.

14. The method of claim 13 further comprising:
(a) arranging the series of blades so that a root ball for a tree to be transplanted is properly located pursuant to the coordinating read out;
(b) adjusting the series of blades pursuant to the coordinating read out; and
(c) positioning the series of blades so that a trunk of a tree to be transplanted is at a center point of a circle.

15. The method of claim 14 further comprising:
(a) providing the first blade, the second blade; a third blade and a fourth blade on the mechanical tree spade; and
(b) providing a third sighting device mounted on the third blade.

16. The method of claim 15 further comprising a fourth sighting device being mounted on the fourth blade.

17. The method of claim 16 further comprising the first sighting device, the second sighting device, the third sighting device and the fourth sighting device each providing the coordinating read out to a desired location.

18. In a mechanical tree spade having a housing with a series of blades thereon, the series of blades including a positioning means for the series of blades, the improvement comprising:
(a) the series of blades including at least a first blade and a second blade;
(b) a first sighting device being mounted on the first blade;
(c) a second sighting device being mounted on the second blade;
(d) the first sighting device and the second sighting device each providing a coordinating read out to a desired location;
(e) the coordinating read out being related to the positioning means;
(f) the positioning means being adjustable relative to the coordinating read out;
(g) the positioning means having a control means;
(h) the mechanical tree spade being operated by the control means;
(i) the coordinating read out being visible from the control means;
(j) the control means permitting the series of blades thereof to be arranged so that a root ball for a tree to be transplanted is properly located pursuant to the coordinating read out;
(k) the control means adjusting the series of blades pursuant to the coordinating read out;
(l) the series of blades being positioned so that a trunk of a tree to be transplanted is at a center point of a circle;
(m) the series of blades including at least the first blade, the second blade; a third blade and a fourth blade;
(n) a third sighting device being mounted on the third blade;
(o) a fourth sighting device being mounted on the fourth blade; and
(p) the first sighting device, the second sighting device, the third sighting device and the fourth sighting device each providing the coordinating read out to a desired location.

* * * * *